(12) United States Patent
Watanabe

(10) Patent No.: US 9,113,066 B2
(45) Date of Patent: Aug. 18, 2015

(54) IMAGING DEVICE AND METHOD WITH TRANSPORTING MICROLENS ARRAY

(75) Inventor: Toshio Watanabe, Kanagawa (JP)

(73) Assignee: Sony Corporation, Tokyo (JP)

( * ) Notice: Subject to any disclaimer, the term of this patent is extended or adjusted under 35 U.S.C. 154(b) by 1794 days.

(21) Appl. No.: 12/149,555

(22) Filed: May 5, 2008

(65) Prior Publication Data

US 2008/0309813 A1    Dec. 18, 2008

(30) Foreign Application Priority Data

Jun. 18, 2007    (JP) .................................. 2007-159738

(51) Int. Cl.
| | |
|---|---|
| *H04N 5/335* | (2011.01) |
| *G02B 15/10* | (2006.01) |
| *H04N 5/232* | (2006.01) |
| *G02B 27/46* | (2006.01) |

(52) U.S. Cl.
CPC ............... *H04N 5/232* (2013.01); *G02B 27/46* (2013.01)

(58) Field of Classification Search
CPC ..................................................... G02B 15/10
USPC .............. 348/340, 294; 396/73; 359/619, 621
See application file for complete search history.

(56) References Cited

U.S. PATENT DOCUMENTS

| | | | | |
|---|---|---|---|---|
| 4,887,107 A | * | 12/1989 | Nakamura et al. ............... | 396/75 |
| 2003/0156266 A1 | * | 8/2003 | Tanitsu ........................... | 355/67 |
| 2004/0239785 A1 | * | 12/2004 | Nanjo et al. ................... | 348/294 |
| 2007/0252074 A1 | | 11/2007 | Ng et al. | |

FOREIGN PATENT DOCUMENTS

| | | |
|---|---|---|
| JP | 2003-134418 | 5/2003 |
| JP | 2003-330419 | 11/2003 |
| JP | 2004-191893 | 7/2004 |
| JP | 2005-167484 | 6/2005 |
| JP | 2006-030318 | 2/2006 |
| JP | 2008-515110 | 5/2008 |
| JP | 2008-167395 | 7/2008 |
| JP | 2008-294741 | 12/2008 |
| WO | WO-2006/039486 | 4/2006 |

OTHER PUBLICATIONS

Japanese Office Action issued Apr. 21, 2009 for corresponding Japanese Application No. 2007-159738.
NG, Ren, et al, "Light Field Photography with a Hand-held Plenoptic Camera" pp. 1-11, Stanford Tech Report CTSR Feb. 2005.

* cited by examiner

*Primary Examiner* — Joel Fosselman
(74) *Attorney, Agent, or Firm* — Fishman Stewart Yamaguchi PLLC

(57) ABSTRACT

Disclosed herein is an imaging device including an imaging lens; a microlens array section; an imaging element; and a transporting section adapted to transport the microlens array section.

2 Claims, 9 Drawing Sheets

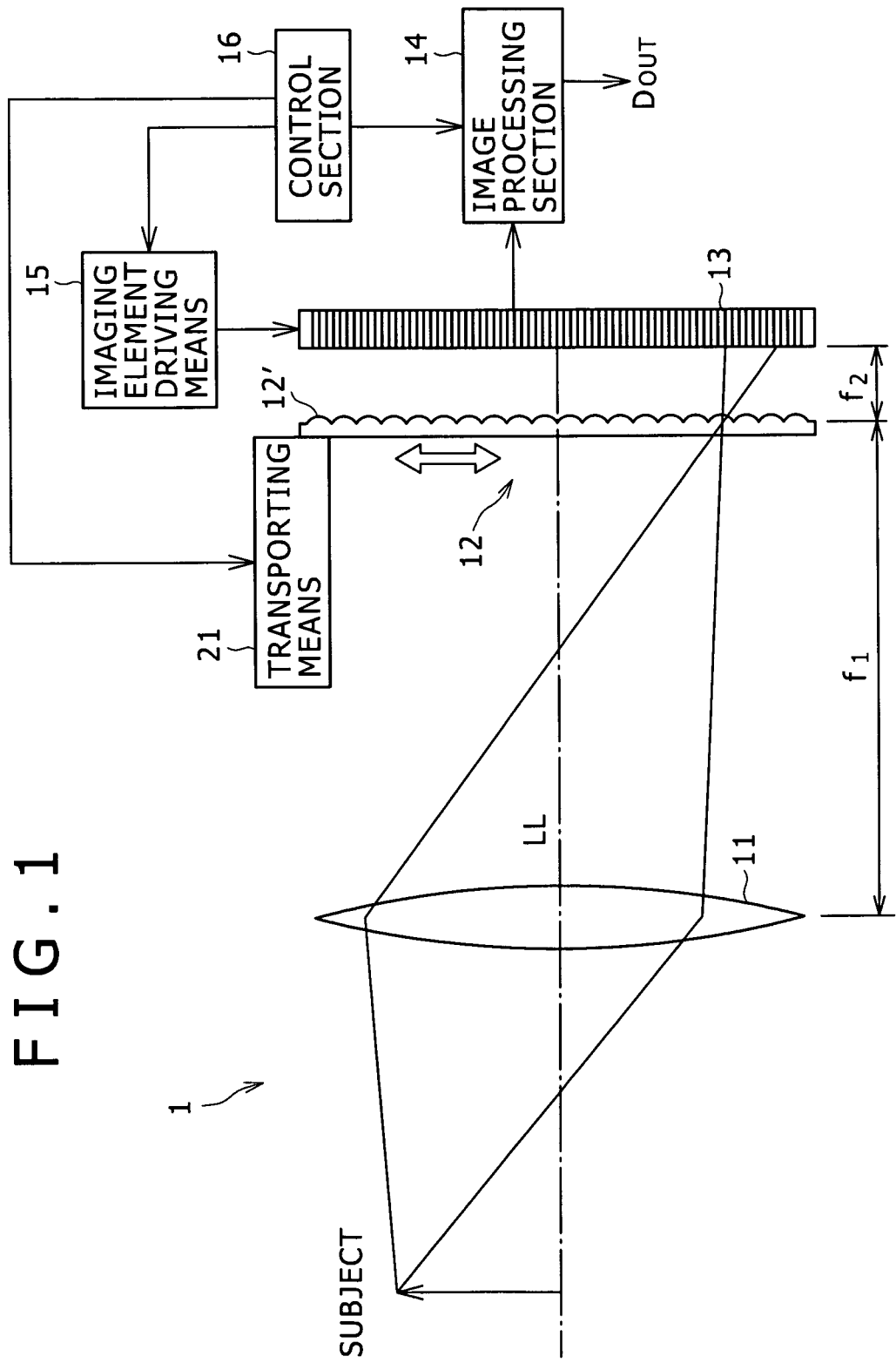

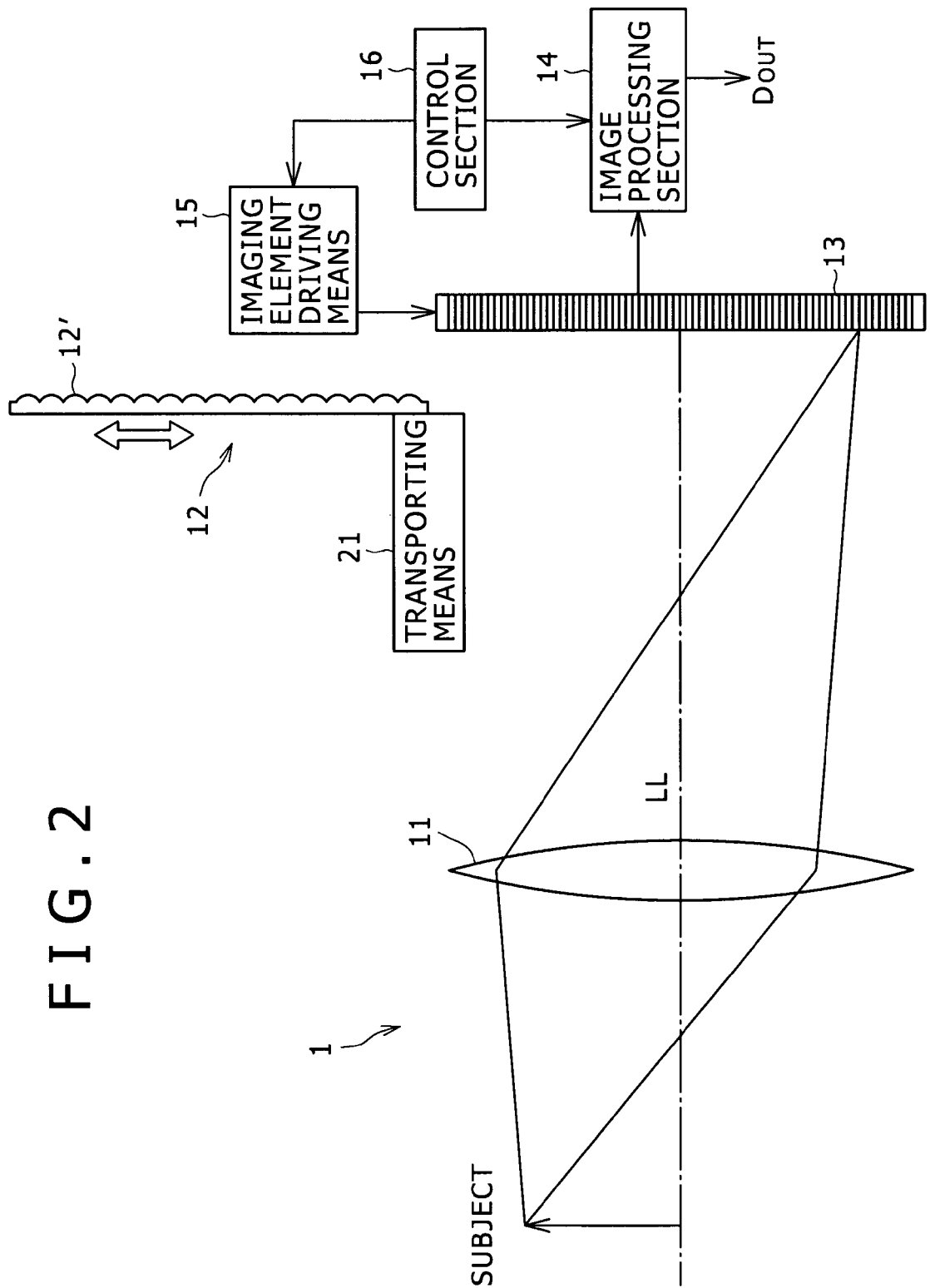

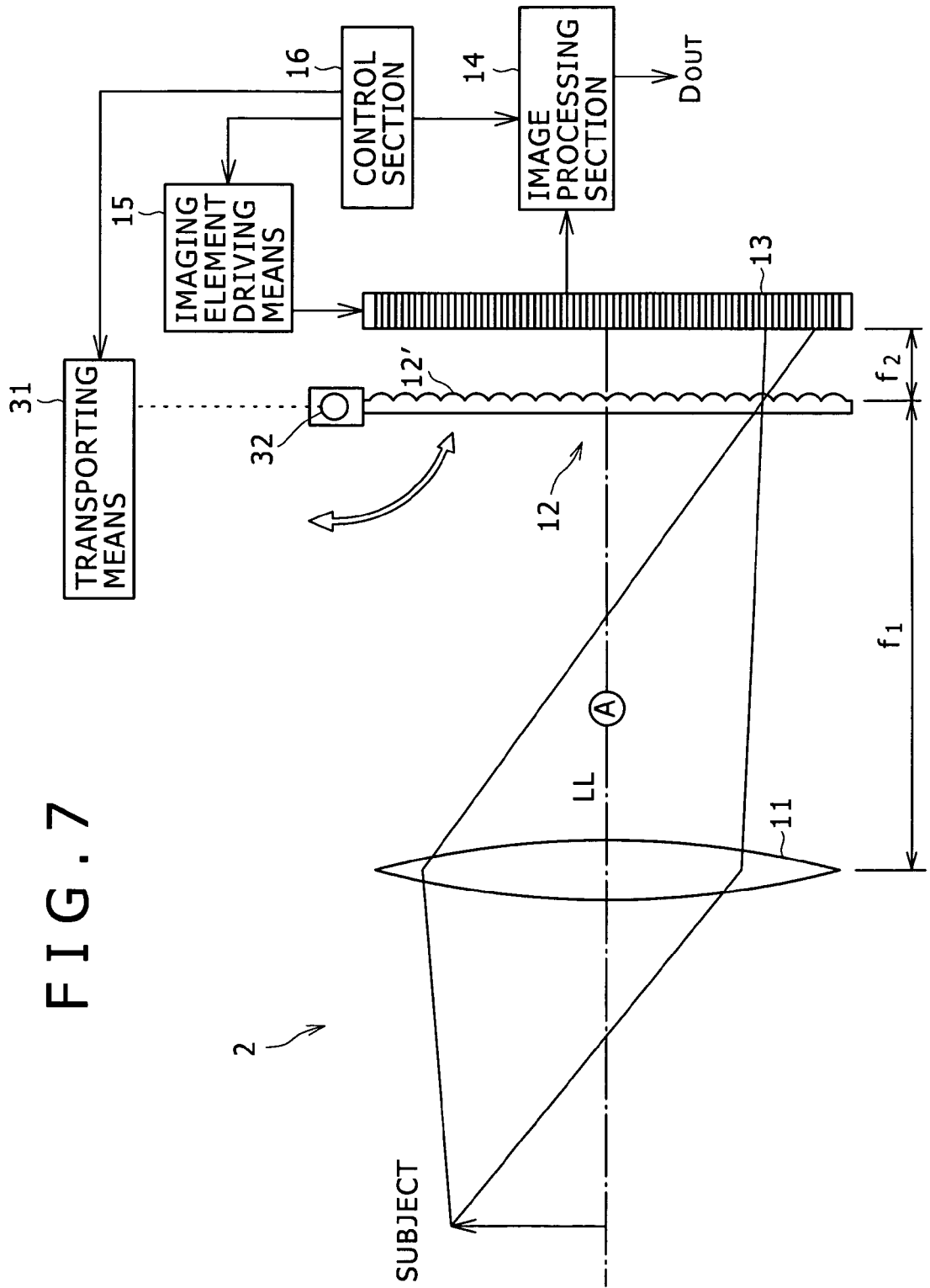

IMAGING DEVICE AND METHOD WITH TRANSPORTING MICROLENS ARRAY

CROSS REFERENCES TO RELATED APPLICATIONS

The present invention contains subject matter related to Japanese Patent Application JP 2007-159738 filed in the Japan Patent Office on Jun. 18, 2007, the entire contents of which are incorporated herein by reference.

BACKGROUND OF THE INVENTION

1. Field of the Invention

The present invention relates to an imaging device, and specifically a imaging device and method that allows switching between two different imaging modes; one mode based on light field photography, and another mode which is a normal high-resolution imaging mode for imaging.

2. Description of the Related Art

A wide variety of imaging devices have been proposed and developed to date. Further, imaging devices have been proposed which perform predetermined image processing on the imaging signal obtained as a result of imaging to output the resultant signal. For example, PCT Patent Publication No. WO06/039486 pamphlet and Ren. Ng, et al, "Light Field Photography with a Hand-Held Plenoptic Camera", Stanford Tech Report CTSR 2005-02 propose an imaging device which employs a technique called "light field photography." This imaging device includes an imaging lens, a microlens array, a photoreceptor and an image processing section. The imaging signal from the photoreceptor contains not only the light intensity on the photoreceptive surface of the photoreceptor, but also information about the traveling direction of light. The image processing section reconstructs an observation image as seen from an arbitrary viewpoint or direction based on such an imaging signal.

SUMMARY OF THE INVENTION

Incidentally, users of an imaging device using light field photography are expected to switch, as appropriate, between two imaging modes; one mode which is a normal high-resolution imaging mode not using light field photography, and another based on light field photography.

In light of the above, it is a purpose of the present invention to provide an imaging device having a simple configuration and construction and an imaging method using the same which permit easy switching, for example, between two different imaging modes, one mode based on light field photography and another mode which is a normal high-resolution imaging mode.

To achieve the above goal, the imaging device of the present invention includes;

(A) an imaging lens;
(B) a microlens array section;
(C) an imaging element; and
(D) a transporting section adapted to transport the microlens array section.

Imaging is accomplished in first and second imaging modes.

The microlens array section can travel between first and second positions as a result of the operation of the transporting section.

The microlens array section is located at the first position while imaging in the first imaging mode. The light which has passed through the imaging lens forms an image directly on the imaging surface of the imaging element without passing through the microlens array section.

The microlens array section is located at the second position while imaging in the second imaging mode. The light which has passed through the imaging lens passes through microlenses. The microlenses make up the microlens array section disposed where an image is formed by the imaging lens. The light which has passed through the microlenses forms an image on the imaging surface of the imaging element.

To achieve the above goal, the imaging method of the present invention uses the imaging device of the present invention. The imaging device includes;

(A) an imaging lens;
(B) a microlens array section;
(C) an imaging element; and
(D) a transporting section adapted to transport the microlens array section.

The microlens array section can travel between first and second positions as a result of the operation of the transporting section.

The imaging method includes two steps. The first step locates the microlens array section at the first position while imaging in the first imaging mode. The same step further causes the light which has passed through the imaging lens to form an image directly on the imaging surface of the imaging element without the light passing through the microlens array section.

The second step locates the microlens array section at the second position while imaging in the second imaging mode. The same step further causes the light which has passed through the imaging lens to pass through microlenses. The microlenses make up the microlens array section disposed where an image is formed by the imaging lens. The same step causes the light which has passed through the microlenses to form an image on the imaging surface of the imaging element.

In the imaging device of the present invention or an imaging device used for the imaging method of the present invention (hereinafter collectively referred to as the "imaging or other device of the present invention", the microlens array section can be configured to be able to travel with a predetermined angle formed with the optical axis of the imaging device. Alternatively, the same section can be configured to be able to rotate around a rotating shaft. The rotating shaft runs parallel to a virtual axis which is orthogonal to the optical axis of the imaging device. It should be noted that, for the sake of convenience, the former configuration is referred to as the "1A configuration" and the latter configuration is referred to as the "1B configuration". Here, although an angle of 90 degrees may be an example of the predetermined angle, the predetermined angle is not limited thereto.

The imaging or other device of the present invention having the above preferred embodiment includes an image processing section. The same section is adapted to perform predetermined image processing on the signal from the imaging element. The image processing section does not perform the image processing while imaging in the first imaging mode. The same section performs the image processing while imaging in the second imaging mode.

In the imaging or other device of the present invention having the preferred configuration described above, the microlenses making up the microlens array section preferably have a larger surface curvature on the side of the imaging element (curvature ($r_2$)) than on the side of the imaging lens (curvature ($r_1$)). Here, the curvature refers to the value at the intersection between the optical axis and microlens surface. In this case, the microlenses making up the microlens array section are preferably convex lenses having their convex surfaces facing the imaging element. That is, the microlenses are preferably double- or flat-convex lenses.

An ordinary imaging lens incorporated in a device such as video camcorder or still camera is an example of the imaging lens incorporated in the imaging or other device of the present invention having one of the various preferred configurations described above. A plurality of CCD (Charge Coupled Device) or CMOS sensors (these will be hereinafter referred to as the "imaging sensors making up the imaging element" for the sake of convenience) arranged in a two-dimensional matrix form are examples of the imaging element (imaging section). Poly (methyl methacrylate) resin (PMMA), polycarbonate resin (PC), polyarylate resin (PAR), polyethylene terephthalate resin (PET), acryl-based resins and ABS resins are examples of the material making up the microlens array section. Further, glass is also an example of such a material. The microlens array section can be manufactured using publicly known methods. The same section includes a plurality of microlenses arranged in a two-dimensional matrix form. The microlens array section may be partitioned into a plurality of areas so that the focal distance of the microlenses can be changed on an area-by-area basis. Alternatively, the microlens array section may be partitioned into a plurality of areas so that the diameter of the microlenses can be changed on an area-by-area basis. A plurality of imaging sensors are associated with one microlens. The plurality of imaging sensors may be divided, in a sense, into blocks (segments) so that imaging data can be produced based on imaging information from the imaging sensors divided into blocks. The microlens array section is preferably configured so that the light emitted from one microlens does not enter the imaging sensor associated with the microlens adjacent to the microlens of interest.

For the imaging or other device of the present invention, spherical and non-spherical lenses may be used as the microlenses. However, the types of lenses which can be used are not limited thereto. Among other possible examples are diffractive lenses such as a zone plate, a holographic lens, a kinoform lens and a binary optical element. On the other hand, among examples of the transporting section for the 1A configuration are a combination of a guide section, a linear motor and a biasing section (e.g., spring) and a combination of a guide section, a rack and pinion and a motor. The guide section is adapted to transport the microlens array section. Among the examples of the transporting section for the 1B configuration is a combination of a biasing section (e.g., spring) and a motor and a combination of a motor and a gear.

In the imaging or other device of the present invention, an image from the imaging lens is formed on the imaging element while imaging in the first imaging mode, and an image from the imaging lens passes through the microlenses and is formed on the imaging element while imaging in the second imaging mode. Such an image formation can be readily accomplished by optimizing the focusing operation. More specifically, it is only necessary to optimize the focusing operation in the auto-focusing process while imaging in the first and second imaging modes.

BRIEF DESCRIPTION OF THE DRAWINGS

FIG. 1 is a conceptual diagram illustrating an imaging device of embodiment 1 in a second imaging mode with a microlens array section located at a second position by the transporting section;

FIG. 2 is a conceptual diagram illustrating the imaging device of embodiment 1 in a first imaging mode with the microlens array section located at a first position by the transporting section;

FIG. 7 is a conceptual diagram illustrating an imaging device of embodiment 2 in the second imaging mode with the microlens array section located at the second position by the transporting section;

DETAILED DESCRIPTION OF THE PREFERRED EMBODIMENTS

Figure 3A:
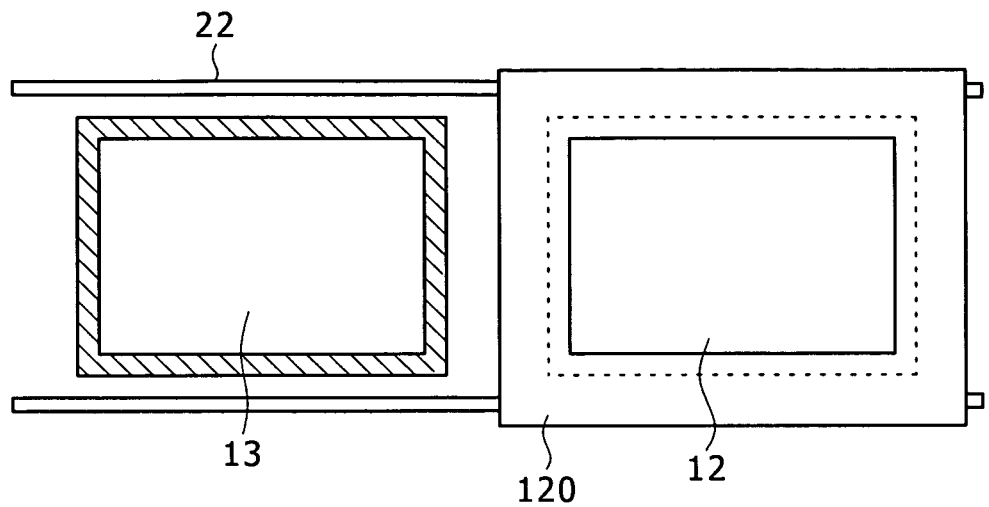
FIGS. 3A and 3B are schematic diagrams of the imaging device of embodiment 1 as seen respectively from the front and top with the microlens array section located at the first position.

In the imaging device and method of the embodiment of the present invention, the light which has passed through the imaging lens forms an image directly on the imaging surface of the imaging element without passing through the microlens array section while imaging in the first imaging mode. While imaging in the second imaging mode, the light which has passed through the imaging lens passes through microlenses. The microlenses make up the microlens array section disposed where an image is formed by the imaging lens. The light which has passed through the microlenses forms an image on the imaging surface of the imaging element. This permits switching between the first and second imaging modes by transporting, or an other section having a simple configuration and construction.

The present invention will be described below based on the preferred embodiments with reference to the accompanying drawings.

Embodiment 1

Embodiment 1 relates to an imaging device and method of the present invention. More specifically, the imaging device of embodiment 1 has the 1A and 1B configurations. FIGS. 1 and 2 illustrate conceptual diagrams of an imaging device 1 of embodiment 1.

The imaging device 1 of embodiment 1 images the subject and outputs imaging data $D_{out}$. The same device 1 includes;
 (A) an imaging lens 11;
 (B) a microlens array section 12;
 (C) an imaging element (imaging section) 13; and
 (D) a transporting section 21 adapted to transport the microlens array section 12.

In the imaging device 1 of embodiment 1, imaging is accomplished in the first imaging mode (normal high-resolution imaging mode) and the second imaging mode (mode based on light field photography). Here, the microlens array section 12 can travel between the first and second positions as a result of the operation of the transporting section 21. The same section 12 is located at the first position as a result of the operation of the transporting section 21 while imaging in the first imaging mode. The light which has passed through the imaging lens 11 forms an image directly on the imaging surface of the imaging element 13 without passing through the microlens array section 12 (that is, without being blocked by the same section 12) (refer to FIG. 2). In the meantime, the microlens array section 12 is located at the second position as a result of the operation of the transporting section 21 while imaging in the second imaging mode. The light which has passed through the imaging lens 11 passes through microlenses 12'. The microlenses 12' make up the microlens array section 12 disposed where an image is formed by the imaging lens 11 (more specifically, in embodiment 1, disposed at the focal point of the imaging lens 11, which is the conjugate point with respect to the subject). The light which has passed through the microlenses 12' forms an image on the imaging surface of the imaging element 13 (refer to FIG. 1).

Figure 3B:
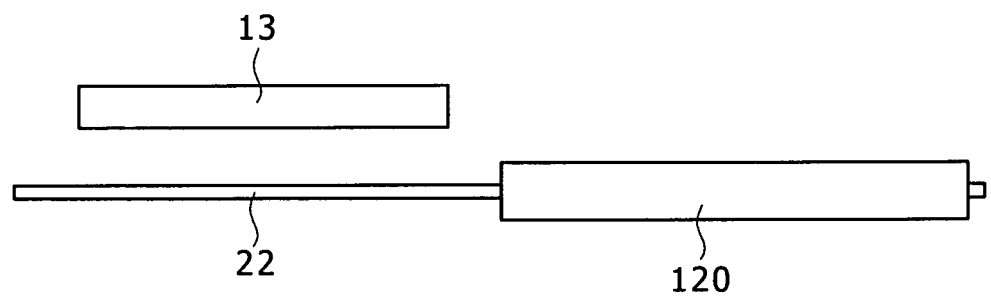
Figure 3C:
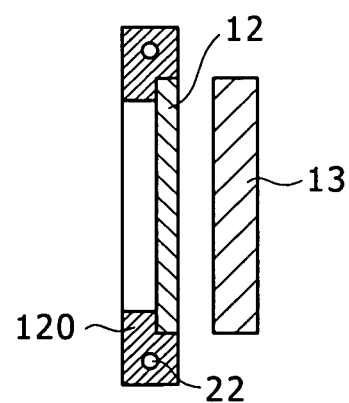
FIG. 3C is a schematic sectional diagram of the microlens array section and other components.
Figure 4A:
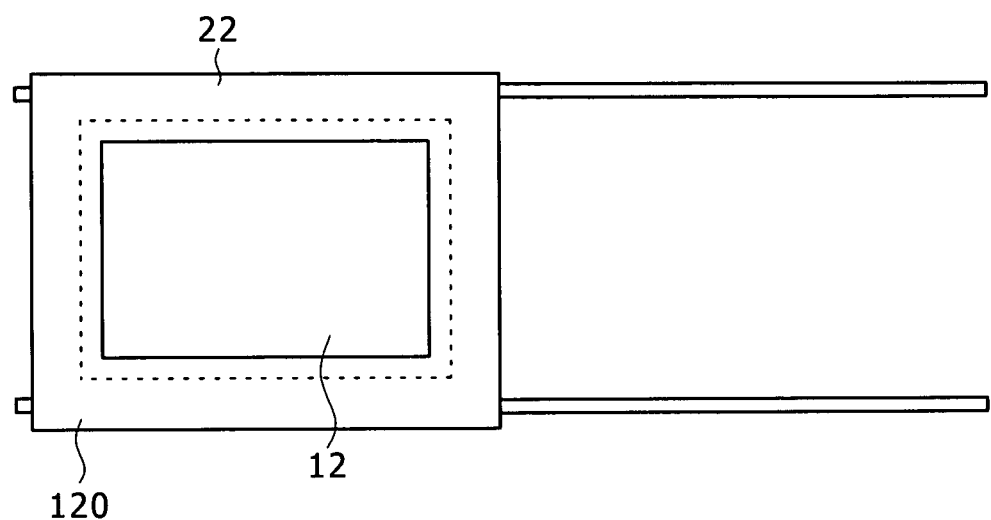
FIGS. 4A and 4B are schematic diagrams of the imaging device of embodiment 1 as seen respectively from the front and top with the microlens array section located at the first position.
Figure 4B:
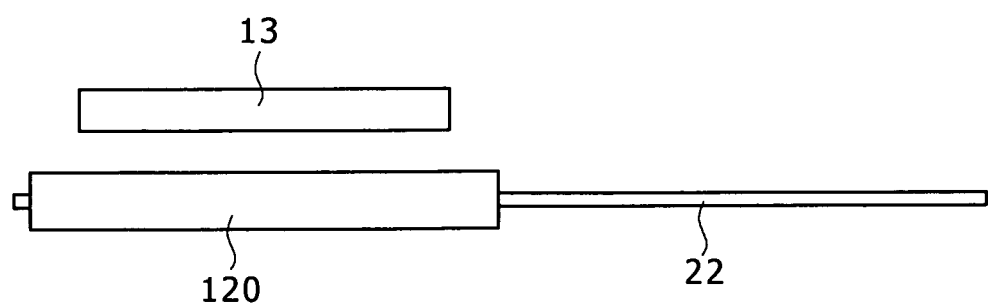

In the imaging device 1 of embodiment 1, the microlens array section 12 can travel with a predetermined angle formed with the optical axis LL of the imaging device 1 (more specifically, in embodiment 1, 90 degrees formed therewith). Yet, more specifically, the transporting section includes a guide section (guide shaft) 22 adapted to transport the microlens array section 12 and a linear motor, which is not shown, as illustrated in the schematic diagrams of FIGS. 3A to 3C and 4A and 4B. The guide section (guide shaft) 22 is fitted to the inside of the imaging device 1 by a proper method. A transporting table 120, which the microlens array section 12 is fitted, is constructed so as to be able to travel on the guide section (guide shaft) 22. Schematic diagrams are shown in FIGS. 3A and 3B. These diagrams illustrate the imaging device 1 as seen respectively from the front and the top, with the microlens array section 12 located at the first position. Schematic diagrams are shown in FIGS. 4A and 4B. These diagrams illustrate the imaging device 1 as seen respectively from the front and the top, with the microlens array section 12 located at the second position. FIG. 3C is a schematic sectional diagram of the microlens array section 12 and other components.

The imaging device 1 of embodiment 1 further includes an image processing section 14. The same section 14 is adapted to perform predetermined image processing on the signal from the imaging element 13. The imaging device 1 still further includes a control section 16 adapted to control the image processing section 14. The same section 14 does not perform the image processing while imaging in the first imaging mode. The same section 14 performs the image processing while imaging in the second imaging mode.

In embodiment 1 or embodiment 2, which will be described later, the imaging lens 11 is a main lens adapted to image the subject. The same lens 11 includes an ordinary imaging lens incorporated, for example, in a video camcorder or a still camera. The microlens array section 12 includes the plurality of microlenses 12' arranged in a two-dimensional matrix form. The same section 12 is disposed along the focal surface of the imaging lens 11, although this may vary depending on how well the imaging lens 11 achieves focus. It should be noted that reference numeral $f_1$ in the figure represents the distance from the center of the imaging lens 11 to the image forming surface of the microlens array section 12. The imaging element 13 includes, for example, a plurality of CCDs arranged in a two-dimensional matrix form. The same element 13 receives the light from the microlens array section 12 to generate an imaging signal. The imaging element 13 is disposed along the focal surface of the microlens array section 12. It should be noted that reference numeral $f_2$ in the figure represents the distance from the center of the microlens array section 12 to the imaging surface of the imaging element 13 (focal distance of the microlenses 12'). The imaging element 13 is driven by an imaging element driving section 15 to control the light reception of the imaging element 13. The control section 16 controls the operations of the image processing section 14, imaging element driving section 15, and transporting section 21. More specifically, the control section 16 controls, as appropriate, the driving of the imaging element driving section 15. At the same time, the same section 16 controls the operations of the image processing section 14 and transporting section 21 according to either of the two imaging modes, namely, the first and second imaging modes. The same section 16 includes a microcomputer.

In embodiment 1 or embodiment 2, which will be described later, the image processing section 14 handles image processing in the second imaging mode. The same section 14 performs predetermined image processing on the signal obtained by the imaging element 13 (imaging signal) in the second imaging mode, and outputs the processed signal as the imaging data $D_{out}$. More specifically, the same section 14 performs a refocusing calculation based on the light field photography. This makes it possible to reconstruct an observation image as seen from an arbitrary viewpoint or direction and obtain three-dimensional information of the image. The refocusing calculation will be described later.

Figure 5:
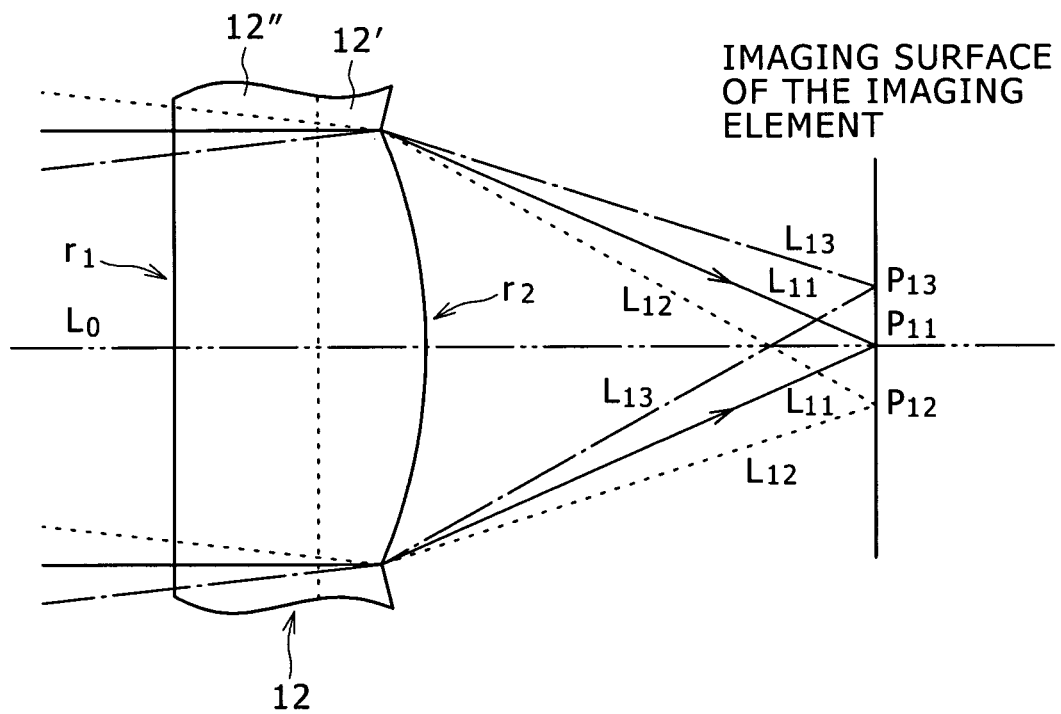
FIG. 5 is a schematic partial sectional diagram illustrating the microlens array section, in an enlarged form, for a description of the lens effect of the microlens array section.

FIG. 5 illustrates a schematic partial sectional diagram illustrating the microlens array section 12 in embodiment 1, or embodiment 2, which will be described later. Further, the microlenses 12' making up the microlens array section 12 preferably has a larger surface curvature on the side of the imaging element 13 (curvature $(r_2)$) than on the side of the imaging lens 11 (curvature $(r_1)$). More specifically, $r_1/r_2=0$ in embodiment 1. The microlenses 12' making up the microlens array section 12 are convex lenses having their convex surfaces facing the imaging element 13.

Figure 9A:
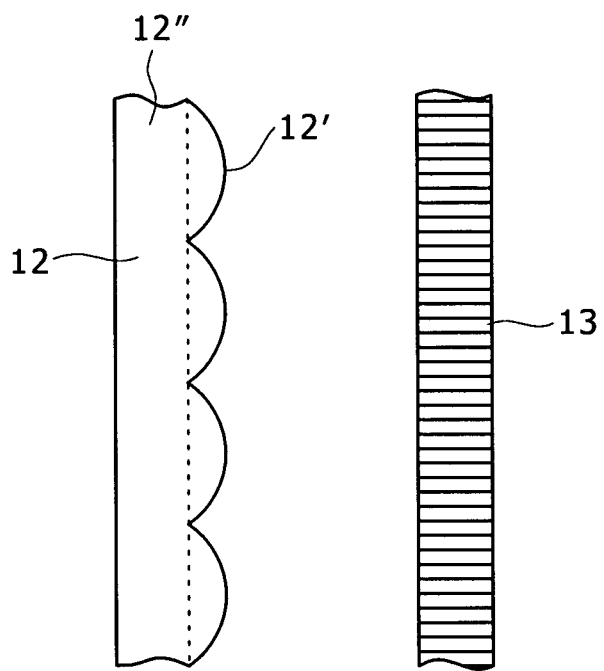
FIGS. 9A and 9B are schematic diagrams illustrating the arrangement of the microlens array section and imaging element.
Figure 9B:
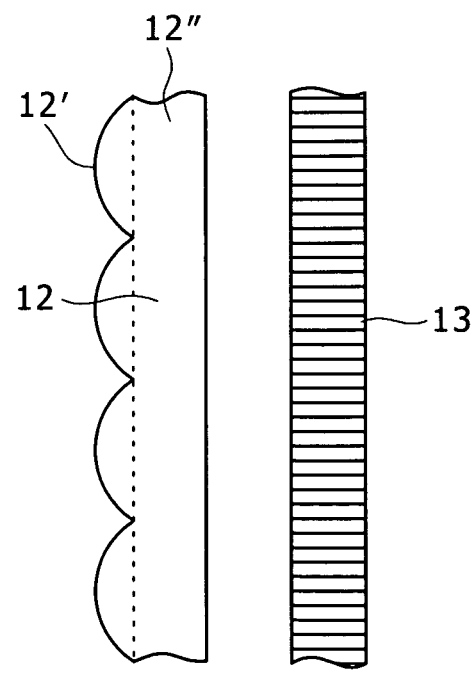

FIGS. 9A and 9B schematically illustrate the arrangement of the microlens array section 12 and imaging element 13. In the example illustrated in FIG. 9A, the microlenses 12' making up the microlens array section 12 are convex lenses having their convex surfaces facing the imaging element 13, as with the imaging device of embodiment 1. In the example illustrated in FIG. 9B, on the other hand, the microlenses 12' making up the microlens array section 12 are convex lenses having their convex surfaces facing the imaging lens 11. Even if the microlenses 12' shown in FIG. 9A and those shown in FIG. 9B have the same focal distance, the microlenses 12' shown in FIG. 9B have a shorter distance between the microlens array section 12 and the imaging element 13. The distance is shortened by the thickness of a base portion 12" of the microlens array section 12. As a result, the microlenses 12' shown in FIG. 9A offer more design freedom than those shown in FIG. 9B. Therefore, it is preferable to adopt the configuration and construction of the microlenses 12' shown in FIG. 9A.

To use natural light containing a variety of wavelengths for imaging, as with the imaging device 1 of embodiment 1, the microlenses 12' are preferably non-spherical lenses having their non-spherical surfaces facing the imaging element 13. The microlenses 12' including non-spherical lenses provide a larger curvature than those including spherical lenses, thus facilitating the optical design. On the other hand, as compared to the microlenses 12' including diffractive lenses, the microlenses 12' including non-spherical lenses can eliminate the wavelength dependence of the refraction of incident light, thus preventing axial chromatic aberration or other problems. This provides a configuration suited for imaging using natural light containing a variety of wavelengths. It should be noted that there are no such problems as wavelength dependence and axial chromatic aberration in imaging applications using monochromatic light. As a result, the microlenses 12' including diffractive lenses may provide better optical characteristics than those including non-spherical lenses.

The operation of the imaging device 1 of embodiment 1 will be described in detail with reference to FIGS. 1, 2, 5 and 6A and 6B. FIG. 5 is a schematic partial sectional diagram for describing the lens effect of the microlens array section 12.

In the imaging device 1 of embodiment 1, while imaging in the second mode, the transporting section 21 travels under control of the control section 16 to locate the microlens array section 12 at the second position (refer to FIG. 1). As illustrated in FIG. 1, the light which has passed through the imaging lens 11 passes through the microlenses 12', which make up the microlens array section 12 disposed where an image is formed by the imaging lens. The light which has passed through the microlenses forms an image on the imaging surface of the imaging element 13. Thus, an imaging signal is obtained from the imaging element 13 under control of the imaging element driving section 15. That is, in the second imaging mode, an incident light $L_{11}$ entering the microlenses 12' is refracted by the same and collected onto a pixel $PL_{11}$. The pixel $PL_{11}$ is the focal point on an optical axis $L_0$. Thus, while imaging in the second imaging mode, the image formed on the microlenses 12' by the imaging lens 11 can be reformed on (collected and converged onto) the imaging element 13.

On the other hand, while imaging in the first imaging mode, the transporting section 21 travels under control of the control section 16 to locate the microlens array section 12 at the first position (refer to FIG. 2). The light which has passed through the imaging lens 11 forms an image directly on the imaging surface of the imaging element 13 without passing through the microlens array section 12. That is, the subject image from the imaging lens 11 is formed on the imaging element 13 without being affected in any way by the microlens array section 12. As a result, an imaging signal is obtained from the imaging element 13 under control of the imaging element driving section 15.

As illustrated in FIG. 5, the incident light beam $L_{11}$ (shown by a solid line) entering the microlens array section 12 forms an image at a point (pixel) $PL_{11}$ on the imaging element 13. An incident light beam $L_{12}$ (shown by a dotted line) entering the microlens array section 12 forms an image at a point (pixel) $PL_{12}$ on the imaging element 13. An incident light beam $L_{13}$ (shown by an alternate long and short dashed line) entering the microlens array section 12 forms an image at a point (pixel) $PL_{13}$ on the imaging element 13. That is, the incident light beams having different incident directions on the microlens array section 12 forms images at (are collected onto) different points (different pixels) on the imaging element 13.

Such image formation can be easily accomplished by optimizing the focusing operation of the imaging lens 11. For example, it is only necessary to optimize the focusing operation (process) while imaging in the first and second imaging modes in the auto-focusing process. The same is true for embodiment 2.

The imaging signal obtained by the imaging element 13 is transmitted to the image processing section 14. The image processing section 14 performs predetermined image processing on the imaging signal and outputs the processed signal as the imaging data $D_{out}$ under control of the control section 16. More specifically, the image processing section 14 does not perform the image processing while imaging in the first imaging mode under control of the control section 16. As a result, the input imaging signal is output in an as-is manner as the imaging data $D_{out}$. On the other hand, the same section 14 performs the image processing (refocusing calculation) under control of the control section 16. As a result, the input imaging signal undergoes the predetermined image processing before being output as the imaging data $D_{out}$.

Here, a description of the refocusing calculation will be given with reference to FIGS. 6A and 6B. The refocusing calculation is a type of image processing performed by the image processing section 14. The refocusing calculation applies similarly to embodiment 2, which will be described later.

Figure 6A:
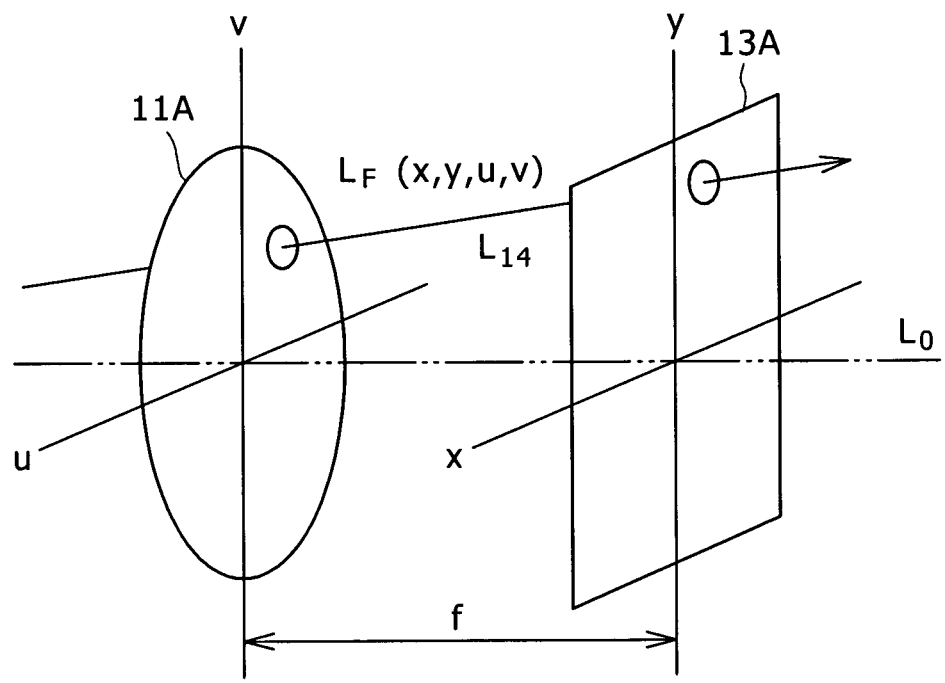
FIG. 6A is a conceptual diagram of an imaging lens and other components for describing the image processing in the second imaging mode.
Figure 6B:
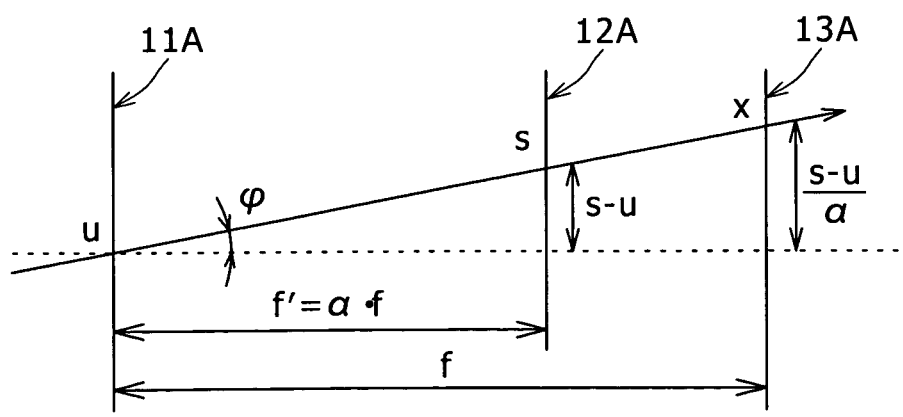
FIG. 6B is a diagram for describing the image processing in the second imaging mode.

As illustrated in FIG. 6A, a rectangular coordinate system (u, v) is assumed on an imaging lens surface 11A of the imaging lens 11, and a rectangular coordinate system (x, y) is assumed on an imaging surface 13A of the imaging element 13. Letting f be the distance between the imaging lens surface of the imaging lens 11 and the imaging surface of the imaging element 13, a light beam $L_{14}$ passing through the imaging lens 11 and imaging element 13 can be expressed by a four dimensional function $L_F$ (x, y, u, v) as illustrated in FIG. 6A. As a result, not only positional information of the light beam $L_{14}$, but also information of its traveling direction can be obtained. In this case, we assume that a refocusing surface 12A (image forming surface of the microlens array section 12 where an image from the imaging lens 11 is formed) is positioned relative to the imaging lens surface 11A and imaging surface 13A, as illustrated in FIG. 6B, that is, we assume that the refocusing surface 12A is positioned so that f'=α·f. Then, a detected intensity $L_{F'}$ (s, t, u, v) of the light beam on the imaging surface 13A can be expressed by an Equation (1) shown below when the light beam passes through a point having the coordinates (s, t) on the refocusing surface 12A. On the other hand, an image $E_{F'}$ (s, t) obtained on the refocusing surface 12A is the integral of the detected intensity $L_{F'}$ (s, t, u, v) with respect to the lens diameter. Therefore, the image $E_{F'}$ (s, t) can be expressed by an Equation (2) shown below. As a result, the refocusing calculation based on Equation (2) makes it possible to reconstruct an observation image from an arbitrary viewpoint or direction and obtain three-dimensional information of the image by using the imaging data $D_{out}$ based on light field photography.

$$L_{F'}(s, t, u, v) = L_{(\alpha \cdot F)}(s, t, u, v) \quad (1)$$
$$= L_F\left(u + \frac{s-u}{\alpha}, v + \frac{t-v}{\alpha}, u, v\right)$$
$$= L_F\left\{u\left(1 - \frac{1}{\alpha}\right) + \frac{s}{\alpha}, v\left(1 - \frac{1}{\alpha}\right) + \frac{t}{\alpha}, u, v\right\}$$

$$E_{F'}(s, t) = \frac{1}{F'^2} \int\int L_{F'}(s, t, u, v) du dv \quad (2)$$
$$= \frac{1}{\alpha^2 F^2} \int\int L_F\left\{u\left(1 - \frac{1}{\alpha}\right) + \frac{s}{\alpha}, v\left(1 - \frac{1}{\alpha}\right) + \frac{t}{\alpha}, u, v\right\} du dv$$

Thus, while imaging in the first imaging mode in embodiment 1, the light which has passed through the imaging lens 11 forms an image directly on the imaging surface 13A of the imaging element 13 without passing through the microlens array section 12. While imaging in the second imaging mode, the light which has passed through the imaging lens 11 passes through the microlenses 12'. The microlenses make up the microlens array section 12 disposed where an image is formed by the imaging lens 11. The light which has passed through the microlenses 12' forms an image on the imaging surface 13A of the imaging element 13. This permits easy switching between the first and second imaging modes using the transporting section 21 or another section having a simple configuration and construction.

Further, the microlenses 12' including non-spherical lenses provide a larger curvature than those including spherical lenses, thus facilitating the optical design. On the other hand, as compared to the microlenses 12' including diffractive lenses, the microlenses 12' including non-spherical lenses eliminates the wavelength dependence of the refraction of incident light, thus preventing axial chromatic aberration or other problems. This provides a configuration best suited for imaging using natural light containing a variety of wavelengths.

Embodiment 2

Figure 8:
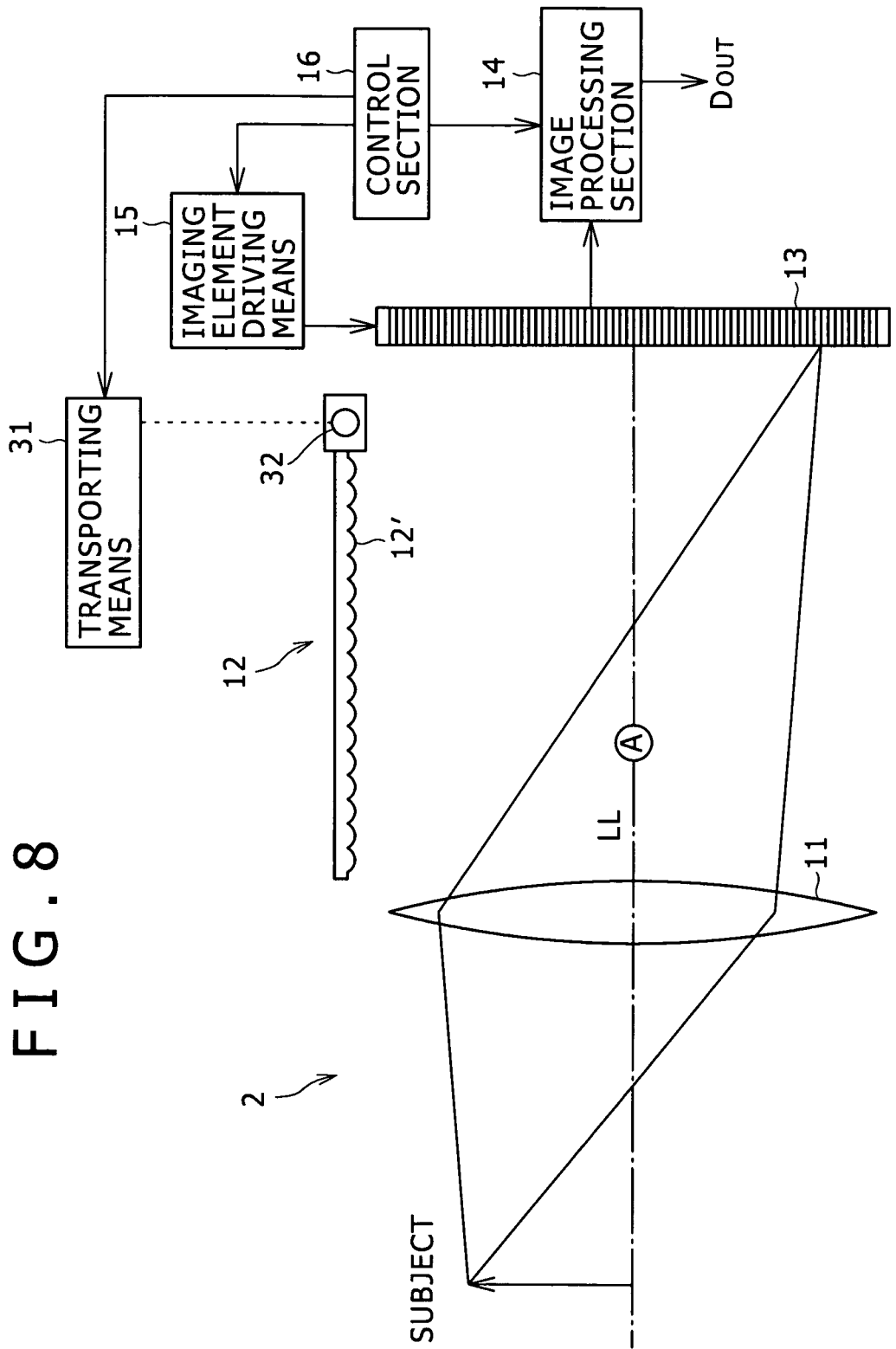
FIG. 8 is a conceptual diagram illustrating the imaging device of embodiment 2 in the first imaging mode with the microlens array section located at the first position by the transporting section.

Embodiment 2 relates to a modification of embodiment 1, and specifically the configuration 1B. Conceptual diagrams of the imaging device of embodiment 2 are shown in FIG. 7 (second imaging mode) and FIG. 8 (first imaging mode). In an imaging device 2 of embodiment 2, the microlens array section 12 can rotate around a rotating shaft 32. The rotating shaft 32 runs parallelly to a virtual axis (shown as an axis 'A' in FIGS. 7 and 8) which is orthogonal to an optical axis LL of the imaging device 2. Here, a transporting section 31 includes a gear/motor combination (not shown) connected to the rotating shaft 32. The microlens array section 12 is fitted to a transporting table (not shown) as in embodiment 1. The rotating shaft 32 is disposed at the end portion of the transporting table. The rotating shaft 32 is fitted to the inside of the imaging device 2 by a proper method.

Also, in the imaging device 2 of embodiment 2, the microlens array section 12 is located at the first position (refer to FIG. 8) as a result of the operation of the transporting section 31 while imaging in the first imaging mode (normal high-resolution imaging mode). The light which has passed through the imaging lens 11 forms an image directly on the imaging surface of the imaging element (imaging section) 13 without passing through the microlens array section 12. The microlens array section 12 is located at the second position (refer to FIG. 7) as a result of the operation of the transporting section 31 while imaging in the second imaging mode (imaging mode based on light field photography). The light which has passed through the imaging lens 11 passes through the microlenses 12'. The microlenses make up the microlens array section 12 disposed where an image is formed by the imaging lens 11. The light which has passed through the microlenses 12' forms an image on the imaging surface 13A of the imaging element 13.

Except for the configuration and construction of the transporting section 31, the imaging device 2 of embodiment 2 can be configured and constructed in the same manner as the imaging device 1 of embodiment 1. Therefore, a detailed description thereof will be omitted.

Although described with reference to the preferred embodiments, the present invention is not limited thereto and may be modified in various manners. In the embodiments, the refocusing calculation based on light field photography was described as an image processing method of the image processing section 14. However, the image processing method of the same section 14 is not limited thereto, and other image processing methods (e.g., image processing involving moving the field of view or image processing which calculates the distance by causing the microlens array section and imaging lens to function as a type of stereo camera) also may be used.

It should be understood by those skilled in the art that various modifications, combinations, subcombinations and alterations may occur depending on design requirements and other factors in so far as they are within the scope of the appended claims or the equivalents thereof.

What is claimed is:

1. An imaging device comprising:
an imaging lens;
a microlens array section;
an imaging element; and
transporting means adapted to transport the microlens array section, wherein
imaging is accomplished in first and second imaging modes,
the microlens array section is configured travel between first and second positions as a result of the operation of the transporting means,
such that when the microlens array section is located at the first position while imaging in the first imaging mode, the light which has passed through the imaging lens forms an image directly on the imaging surface of the imaging element without passing through the microlens array section, and
when the microlens array section is located at the second position while imaging in the second imaging mode, the light which has passed through the imaging lens passes through microlenses making up the microlens array section disposed where an image is formed by the imaging lens, and forms an image on the imaging surface of the imaging element, and wherein
the microlenses making up the microlens array section have a larger surface curvature on the side of the imaging element than on the side of the imaging lens.

2. An imaging device comprising:
an imaging lens;
a microlens array section;
an imaging element; and
transporting means adapted to transport the microlens array section, wherein
imaging is accomplished in first and second imaging modes,
the microlens array section is configured travel between first and second positions as a result of the operation of the transporting means,
such that when the microlens array section is located at the first position while imaging in the first imaging mode, the light which has passed through the imaging lens forms an image directly on the imaging surface of the imaging element without passing through the microlens array section, and
when the microlens array section is located at the second position while imaging in the second imaging mode, the light which has passed through the imaging lens passes through microlenses making up the microlens array section disposed where an image is formed by the imaging lens, and forms an image on the imaging surface of the imaging element, and wherein
the microlenses making up the microlens array section are convex lenses having their convex surfaces facing the imaging element.

* * * * *